(12) United States Patent
Boni

(10) Patent No.: US 7,822,186 B1
(45) Date of Patent: Oct. 26, 2010

(54) METHODS AND SYSTEMS FOR TIME-BASED DELIVERY OF CALLS

(75) Inventor: Piotr Boni, Providence, RI (US)

(73) Assignee: Verizon Laboratories Inc., Waltham, MA (US)

( * ) Notice: Subject to any disclaimer, the term of this patent is extended or adjusted under 35 U.S.C. 154(b) by 906 days.

(21) Appl. No.: 10/370,850

(22) Filed: Feb. 20, 2003

Related U.S. Application Data

(60) Provisional application No. 60/358,634, filed on Feb. 21, 2002.

(51) Int. Cl.
*H04M 3/42* (2006.01)

(52) U.S. Cl. ............................ 379/210.01; 379/202.01; 379/203.01; 379/204.01; 379/205.01; 379/207.01; 379/209.01; 379/212.01

(58) Field of Classification Search ............ 379/202.01, 379/203.01, 204.01, 205.01, 206.01, 207.01, 379/207.02, 207.03
See application file for complete search history.

(56) References Cited

U.S. PATENT DOCUMENTS

| | | | |
|---|---|---|---|
| 4,969,185 A * | 11/1990 | Dorst et al. ............ | 379/210.01 |
| 5,848,132 A * | 12/1998 | Morley et al. .......... | 379/210.01 |
| 6,374,102 B1 * | 4/2002 | Brachman et al. ....... | 455/422.1 |
| 6,760,423 B1 * | 7/2004 | Todd ..................... | 379/202.01 |
| 6,870,916 B2 * | 3/2005 | Henrikson et al. ..... | 379/202.01 |
| 6,876,734 B1 * | 4/2005 | Summers et al. ....... | 379/202.01 |
| 6,885,740 B2 * | 4/2005 | Ernstrom et al. ....... | 379/207.02 |
| 7,003,735 B2 * | 2/2006 | Edlund et al. ............... | 715/810 |
| 2003/0021400 A1 * | 1/2003 | Grandgent et al. ..... | 379/202.01 |

OTHER PUBLICATIONS

Generic Requirements for ISDN PRI Two B-Channel Transfer, Bellcore Communications Research, GR-2865-CORE, Issue 2, May 1997 (109 pp).
AINGR: Switching Systems, Telcordia Technologies, GR-1298-CORE, Issue 6, Nov. 2000 (Section 1 with T of C—596 pp., Section 2 with T of C—672 pp, Section 3 with T of C—938 pp).
F. Dawson, D. Stenerson, RFC 2445, Internet Calendaring and Scheduling Core Object Specification (iCalendar), Nov. 1998, 132 pages.
M. Handley, H. Schulzrinne, E. Schooler, J. Rosenberg, RFC 2543, SIP; Session Initiation Protocol, Mar. 1999, 136 pages.
Specifications of Signalling System No. 7—ISDN Supplementary Services—Transfer, ITU-T Recommendation Q.732, Jul. 1996, 30 pages.

* cited by examiner

*Primary Examiner*—Vincent P Harper
*Assistant Examiner*—Mazda Sabouri

(57) ABSTRACT

Methods and systems are provided for managing the scheduling of calls and automating the process of making and delivering such calls. Any endpoint (e.g., telephony-enabled) device can be used with a PSTN, cellular, and VoIP network. Different types of devices and interfaces may be used for provisioning users, conferring calling events, scheduling events, and/or delivering calls. Among other things, this increases user mobility. Also, automated retrying and rescheduling of calls, which may use updated data, reduces the likelihood of missed calls.

41 Claims, 3 Drawing Sheets

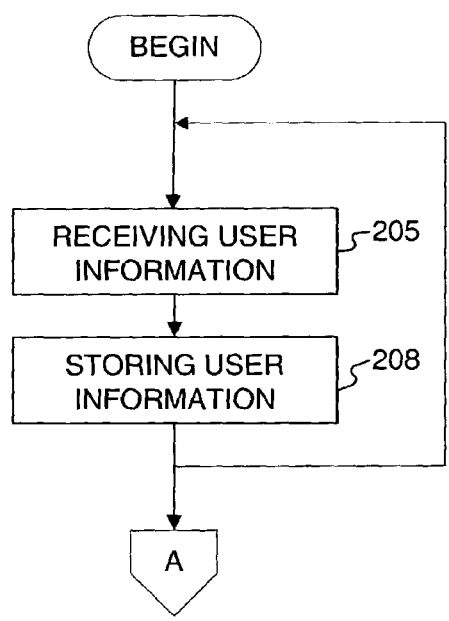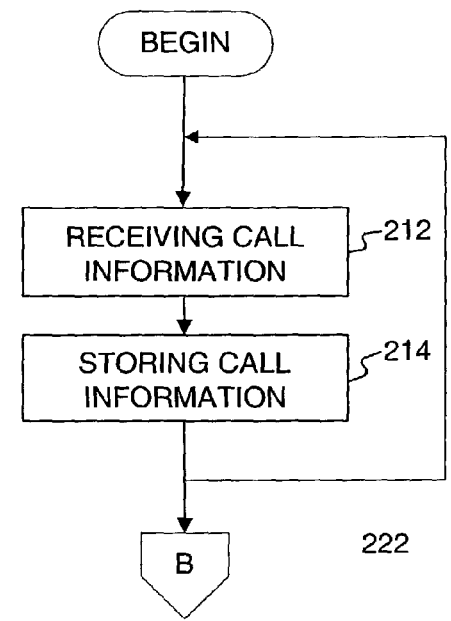
FIG. 2       FIG. 3

METHODS AND SYSTEMS FOR TIME-BASED DELIVERY OF CALLS

CROSS-REFERENCE TO RELATED APPLICATIONS

This relies upon and claims the benefit of U.S. Provisional Patent Application No. 60/358,634, entitled "A Method And System For Time-Based Delivery Of Telephone Calls," filed on Feb. 21, 2002, which is hereby incorporated by reference in its entirety.

BACKGROUND OF THE INVENTION

Scheduling applications, calendaring applications, and organizers are deployed in various systems and environments, such as on personal computers, personal digital assistants ("PDAs"), and the Internet. Such applications have been used to notify subscribers of scheduled activities. However, when a subscriber receives a notification or reminder, the subscriber is typically left to initiate an activity related to the specific scheduling entry. In some cases, such applications are used to schedule conference calls, as well as to leave prerecorded messages.

Although subscribers must be reachable by the scheduling or other application to receive notifications or reminders, this is not always the case. Some network and service providers currently offer wake-up calling services to subscribers on public-switched telephone and cellular networks. These providers, however, offer limited scheduling functionality.

In addition to wake-up calling services, some providers allow for the scheduling of conference calls. Conference calls require "conference servers," which include audio bridges, such as a multipoint control units ("MCU"). An MCU, for example, is a specialized device that mixes multiple audio inputs, generates a composite audio signal, and sends the generated signal to each of the participating endpoint devices. An audio conference, for example, may be initiated using "dial-in" or "dial-out" connection methods. In a dial-in connection, each of the participants has knowledge of a scheduled call prior to the call, and initiates a call to the MCU telephone number at a predetermined time. Once the participant's endpoint is connected with the MCU, the participant becomes a member of the conference call. Thus, the MCU maintains multiple call legs to endpoint devices; the input and output audio channels/streams are established between each participant and the MCU. There are no audio channels established directly between participants.

In a dial-out configuration, conferences may be scheduled with appropriate configuration conferencing software. At the scheduled time, an MCU initiates multiple outbound calls, that is, one outbound call per participant. Once each participant's endpoint is connected with the MCU, she/he becomes a member of the conference. As in the case of the dial-in connection, the MCU forms a hub and maintains multiple call connections to multiple endpoint devices. Again, there are no audio channels established directly between participants. Although multi-party conferences may be automated, such automation must use the dial-out connection method. No peer-to-peer connections and no peer-to-peer audio channels are formed in the dial-out configuration. Even if a two-way conference call could be scheduled, such a call would use disproportionate resources (e.g., an MCU) for a two-way call. The use of an MCU only makes sense from a resource management perspective when such a two-way conference call is extended to more than two participants.

In addition to conference calling, three-party calling is known. Unlike conference calling, three-party ("three-way") calling requires a special three-port trunk in the server or switch in combination with a simple audio bridge. Three-way calling always starts from a two-way telephone call. After the two-way call is established, a caller may extend the call to a three-way communication session by adding a third party. Three-way calling, however, requires active involvement of a participant who initiated the call to use her/his telephone to connect the third party to the call. Generally, a participant may add a third party by (1) pressing a programmed button (e.g., "recall") or switchhook to place the first party on hold, (2) listening for a dial-tone, (3) dialing the telephone number of a third party, (4) forming a new telephone call with the third-party, (5) pressing the programmed button again, thereby connecting all three parties. Because of the active participation required to form the call, no scheduling software is available for this type of three party call.

In view of the foregoing, it would be desirable to provide extended functionality and improved scheduling capabilities in the telephony domain.

It would also be desirable to provide peer-to-peer call scheduling without relatively expensive and specialized equipment normally used to form conference calls.

SUMMARY

Methods and systems consistent with embodiments of this invention provide enhanced activity scheduling in telephony-based networks, such as PSTN, cellular, and Voice over IP ("VoIP") networks. In general, then, a telephony-based network may be any system of computers or other electronic devices interconnected by wires, optical fibers, or other means, including wireless means, to share telephony information. As explained below in more detail, the use of a network enables provisioning scheduling service(s) for users, configuration of scheduled calls, and communication between endpoint devices.

Consistent with an embodiment of the invention, systems are provided that automate the scheduling and delivery of peer-to-peer calls. In such systems, the user scheduling a call may be provided with a full range of call options when originally configuring the call or after the system has initiated the delivery of the call.

According to another embodiment of the invention, methods are provided for delivering a call for a user. Such methods include scheduling a call with a scheduler, triggering the request for the call using a trigger application, dispatching the request using a notification dispatcher, and delivering the call with a server (see below) upon receiving the request from the notification dispatcher, wherein the call is delivered using a call-transfer function.

According to still another embodiment of the invention, systems are provided for scheduling services and delivering calls. Such systems may include a provisioning device that receives user information (e.g., user scheduling service information) relating to a system user, a configuration device that receives a scheduling entry relating to a scheduled call, a database that stores the scheduling entry and user information, a scheduler that receives the scheduling entry and generates a trigger for the entry when the entry becomes due, a notification dispatcher that formulates a call request in response to receiving the trigger, and a server that delivers the call using a call-transfer function.

Embodiments of the invention may be used as planning tools, especially for use in service sectors, such as health care organizations, where upcoming and modified appointments require numerous telephone calls. Thus, to reduce calling service charges, calls may be planned during off-peak periods. Furthermore, telephony notifications (e.g., voice reminders) may be delivered to recipients in remote time zones at a time that is convenient for the recipients, but not necessarily convenient to the subscriber.

In one embodiment consistent with this invention, a caller may schedule a call to an audio conference bridge, for example, which itself uses a dial-in connection method. At the scheduled time, a call is formed between a requestor and an MCU using a telephony "server." In this case, the MCU is the endpoint device. A caller with a three-way calling service may also use this invention to schedule a two-way call and, once such a call is established, extend it to a three-way call.

BRIEF DESCRIPTION OF THE DRAWINGS

Embodiments of the invention will be apparent upon consideration of the following detailed description, taken in conjunction with the accompanying drawings, in which like reference characters refer to like parts throughout, and in which:

FIG. 2 illustrates an exemplary method for provisioning a user (e.g., provisioning a user's scheduling service) consistent with the present invention;

FIG. 3 illustrates an exemplary method for scheduling a call consistent with the present invention.

DETAILED DESCRIPTION

Figure 1:
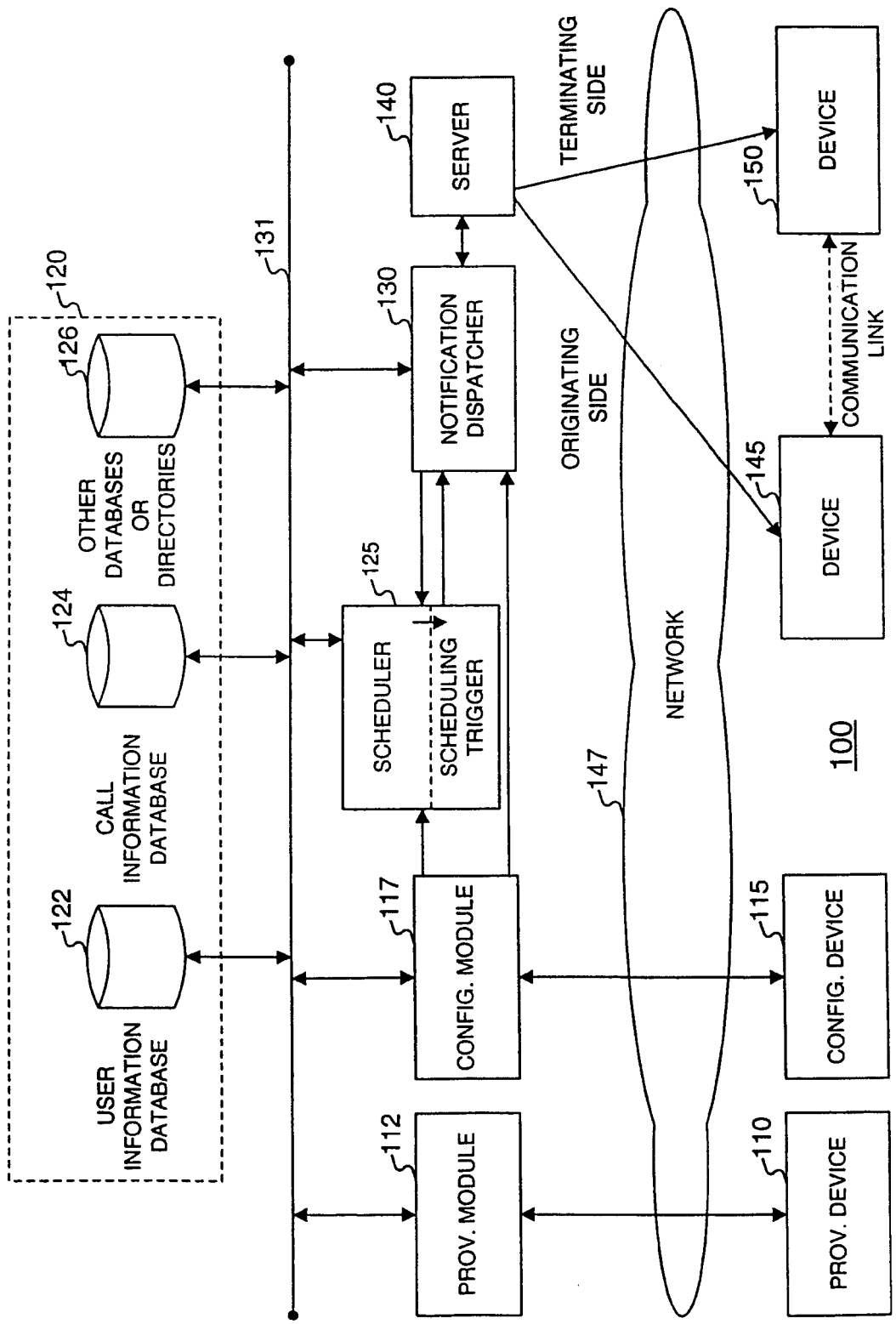
FIG. 1 illustrates an exemplary system for scheduling and delivering calls consistent with certain embodiments of the present invention.

Methods and systems consistent with embodiments of the invention facilitate scheduling and delivering calls in telephony-based networks, such as PSTN, cellular networks, and VoIP networks, using a call-transfer function. Such systems and methods may use a variety of devices and terminals including, but not limited to, personal computers, PSTN telephones, cellular telephones, and PDAs.

"Call-transfer" functionality is available in many domains, including, for example, PSTN, IP telephony, wireless, and cellular domains. In the PSTN domain, the "Two B-Channel Transfer" or "CreateCall" functions may be used. In the IP telephony domain, functional equivalents of PSTN technologies, such as "Call-Transfer," "Server-initiated Call," or "Third-party Call" functions may be used. In the case of the wireless and cellular domains, the server, in the PSTN or VoIP domain may make an outbound call to the cellular endpoint via any appropriate gateway. In one embodiment, call-transfer functionality is described in the International Telecommunication Union—Telecommunication (ITU-T) Recommendation Q.732, currently available at <http://www.itu.int/home/index.html>. Those skilled in the art will appreciate that the term "call-transfer," as used herein, refers generally to any call-transfer-like function that may be performed in any available domain, including, but not limited to, the functions and domains listed hereinabove.

In one embodiment consistent with the present invention, a method is provided for: (i) causing a server to initiate an outbound call to a first endpoint device of the requestor of the scheduled call service, (ii) after connecting the server to the first endpoint, initiating a second outbound call to a requested party endpoint, and (iii) after making this second connection, connecting the two calls together so that requestor and requestor's party may communicate using a call-transfer function. Those skilled in the art will appreciate that an order different from the above-listed order is also possible. Also, pre-recorded messages may be played on either the requesting party's side, the requested party's side, or both sides. After both parties are connected, the audio or video channels/streams (e.g., input and output channels/streams) may be established thereby connecting the two participants. Also, on the requesting party's side, the user may be given the option to continue with the scheduled call or to reschedule it for some later date or to discard it.

As used herein, the terms "communication session" or "telephone call" includes any unidirectional or bidirectional communication link between two endpoint devices. As also used herein, the term "scheduled call" includes any scheduled communications event, including the scheduled forming of a communications session, such as the making of a telephone call. Thus, a telephone call could involve the transmission of audio and/or video information across a communication link.

In one embodiment of the present invention, the scheduling and delivery of calls may be performed using any type of endpoint device. During operation, a service subscriber may enter the time, date, and endpoint device address for a particular call. The back-end system may use existing, widely available, scheduling software, such as calendars based on the Internet Calendaring and Scheduling Core Object Specification (sometimes referred to as iCalendar or "RFC 2445"), to store a subscriber's scheduling entry. At the specified time, the scheduling software is executed and a trigger is sent to a notification dispatcher, which executes the action resulting in a network-initiated call. In one embodiment, the call is first made to the subscriber's chosen, telephony-enabled endpoint device (e.g., a requesting party endpoint device) and then to another device also specified by the subscriber. The order of these calls, however, is unimportant. As described more fully below, one or both of these devices may be specified during a configuration procedure.

According to an embodiment of the invention, if a call is delivered successfully, a communications channel may be formed between a subscriber's chosen device and the destination device enabling, for example, a communication session (e.g., a telephone conversation) between the requesting and requested parties. When the call to the requesting party is delivered, that party may be provided the option of accepting, rejecting, or rescheduling the call for a later time. A subscriber may also place the call directly from the scheduling software before of the call's scheduled time, if desired. If a call is not delivered successfully, then, in one embodiment, the system may reschedule the call based on one or more subscriber preferences. From the end-user's perspective, the simplest case may use a PSTN telephone to connect to a front-end interactive voice response-based application that may communicate with a back-end scheduling system.

A system consistent with this invention may be implemented using a variety of communication technologies (e.g., telephony technologies). Therefore, calls may be initiated from, for example, a computer server or a telephony switch located in the network. Although different methods and technologies may be used depending on the particular domain (e.g., PSTN and VoIP), the delivery or formation of a party-to-party call may involve the following process: (i) a scheduler provides a server with a call request (including appropriate parameters); (ii) the server delivers a first call to a first (e.g., requesting) party endpoint device; (iii) the server makes a second call to a second (e.g., requested) party endpoint device; and (iv) the server bridges the first and second calls using a call-transfer function.

Third party call methods are available, for example, in PSTN and IP telephony. As mentioned above, Two B-Channel Transfer (hereinafter, "TBCT") may be used in a PSTN by connecting two calls from the same controller (i.e., the user requesting TBCT) through two different Primary Rate Interface (hereinafter, "PRI") channels. PRI service provides a method of access to the telephone network that may be, for example, ISDN-based and may provide integration of multiple voice and data transmission channels on the same line. In this case, the server may create two call legs, one leg to the requesting number and one leg to the requested number, and then bridge two calls together.

As used herein, the term "leg" is any branch or lateral circuit connecting an instrument with a main line. Also, the term "server" is any entity or group of entities that provides at least one service to a client or client program. In the context of PSTN networks, the term "server" includes, for example, a service node ("SN"), a service control point ("SCP"), a service switching point ("SSP"), a telephony switch, and the like.

In the case of IP telephony, various call functions may be used, as mentioned above, to accomplish third party call functionality. For example, in IP telephony, functional equivalents of the above and other PSTN technologies, namely Create Call, Call Transfer, and Server-initiated Call or Third-party Call, exist and may be used consistent with this invention. The word "server" in the context of IP telephony, then, may include softswitches, Session Initiation Protocol ("SIP") proxy servers, and other similar entities.

Consistent with this invention, calls may be scheduled and delivered at a scheduled time to all scheduled parties, including the subscriber, at multiple locations. Those skilled in the art will appreciate that a call may include the subscriber himself, but may not. On the other hand, a call could include two or more parties, allowing for the automated scheduling and delivering of conference calls. However, at least one party is connected to the call using a call-transfer function.

FIG. 1 illustrates an exemplary system 100, consistent with one embodiment of the invention. System 100 includes a number of components, implemented through suitable combinations of hardware, software and/or firmware, for scheduling and delivering calls via network 147. For example, system 100 may include a provisioning device 110 for receiving information relating to a user or subscriber's scheduling service, a configuration device 115 for receiving a scheduling entry relating to a scheduled call, and a database 120 for storing the scheduling entry, user information, and any other additional data. System 100 may also include a scheduler 125 for receiving the scheduling entry and generating a trigger based on information in the entry, a notification dispatcher 130 for formulating a call request in response to receiving the trigger, and a server 140 for delivering the call. Further, system 100 may include two or more endpoint devices 145 and 150 or merely interface with them.

Provisioning device 110 can be any device capable of provisioning a user, such as a user's scheduling service. Such device is receiving user's scheduling service information consistent with this invention. Provisioning device 110 may support other functions as well, such as configuring and calls (see below). Once user information (e.g., a user's scheduled services information) is received through device 110, the information may be stored in database 120, which may be local or remote to device 110. User information may include, for example, identification data, user preference data, or a combination thereof. User preference data may include the identification of at least one calling service. One such service could be the scheduling and delivery of person-to-person telephone calls. Additional services include, for example, information services (e.g., weather and traffic information services), and third-party "break-in" services, including news services, that provide additional functionality after a call has been established.

In one embodiment, the provisioning process may be implemented on provisioning device 110 through an interface that may be a computer-based user interface (e.g., an Internet browser's Web page communicating with the Web server), a telephony-based interface (e.g., using dual-tone-multi-frequency (hereinafter, "DTMF"), also known as touch-tone, or via a speech recognition dialog communicating with a voice portal application). The provisioning procedure may be in the form of a network-based software module 112 that communicates with the provisioning device and interoperates with the database to store or update the user information (e.g., the configuration of a service). Module 112 may be a part of a Web application or a voice portal application, depending on the particular type of endpoint device being used. Those skilled in the art will appreciate that the provisioning process is optional, especially when a subscription is unnecessary to use a desired service.

In addition to the provisioning process, a method consistent with this invention can include a configuration process. The configuration, or scheduling, process involves receiving information related to one or more calls to be scheduled. Once this "call" information is received, it may be stored in database 120. Additional data, including text, pre-recorded voice, pre-recorded music, and pre-recorded video, may be stored in database during configuration, as well as during provisioning. All such call-related information may be linked to form a personal scheduling entry that is stored in the database by provisioning device 110, configuration device 115, scheduler 125, notification dispatcher 130, or any other device or application used between call scheduling and delivery. Storage may be performed until successful delivery or cancellation. Those skilled in the art will appreciate that network 131 provides communication links between database 120 and other components of system 100, including notification dispatcher 130, scheduler 125, and configuration and provisioning modules 117 and 112, respectively.

A single device may be used to provision a user and configure a call. That is, provisioning device 110 and configuration device 115 may be the same. As mentioned above, configuration device 115 supports the configuration of calls. Like the provisioning procedure, the configuration process may be in the form of a network-based software module 117 that communicates with the configuration device and interoperates with the scheduler to store a user's scheduling entries. Also, like the provisioning module, the configuring module may be implemented using a computer-based or telephony-based interface.

When a desktop computer, a Wireless Application Protocol (hereinafter, "WAP") enabled cellular telephone, or a PDA is used as a provisioning or configuration device, a user may use a standards-based Web calendar, such as a calendar based on the RFC-2445 standard, and enter a new task or a new reminder directly into this calendar application. Currently deployed Web calendars, such as those provided by Yahoo!®, Netscape®, and MSN® may be used consistent with the present invention.

A voice portal, or speech-enabled access to Web-based information, can also be used to provision or configure consistent with this invention. In general, a voice portal provides telephone users with a natural-language interface to access and retrieve Web content. When a voice portal is used to provide such an interface, a subscriber (e.g., using a PSTN or cellular telephone) may interface with voice menus and prompts to enter scheduling data. In addition, a voice portal can also provide DTMF access as well.

In one embodiment consistent with the present invention, a process monitors at least one scheduling entry, and when it becomes due (i.e., at a specified time and date associated with an entry in the database), it issues a trigger. A trigger could be used to cause a system consistent with this invention to, for example, send a pre-recorded voice message or a voice reminder to another party, engage in a real-time communication session (e.g., telephone conversation), or both. The message may be recorded during configuration (i.e., scheduling). Alternatively, a subscriber may type in the text that, at delivery, may be rendered by text-to-speech ("TTS") technology. Both pre-recorded voice and text messages may be stored, for example in database 120, by notification dispatcher 130 during configuration and delivered by a media server 140. The subscriber may also use this aspect of the system to record a message and have it played back at a convenient scheduled time as a reminder.

As mentioned above, scheduler 125 may be a system that uses existing, widely available, scheduling software to store a subscriber's personal scheduling entries. For example, scheduling software can be implemented on the Internet and, in one embodiment, can be based on the iCalendar specification, RFC 2445. During operation, a scheduling trigger application can be run at a prescheduled time and date consistent with the entry. When the trigger application runs, a trigger can be sent to and invoke notification dispatcher 130.

As mentioned above, notification dispatcher 130 may include a network-based software module that, when invoked by the trigger, initiates a network-created call by passing a call request to server 140. For example, notification dispatcher 130 may, in response to receiving a trigger, dynamically formulate an appropriate telephone call request and then dispatch it to a specific telephony server from its server list, depending on the type of request, the server characteristics and availability, network traffic, and service provider. In addition, notification dispatcher 130 may deliver custom, subscriber-created announcements to a telephony server, which may deliver them to participants of a call, such as just before the call starts. These announcements may be recorded when the subscriber schedules a call and stored in database 126.

For example, a subscriber scheduling a call may create one or more announcements for delivery to herself and/or another party. The announcement may be in the form of text (e.g., and later delivered by a text-to-speech engine), a recorded audio or video file, etc. The announcement may contain business card type information or some other useful tips, hints, or reminders. The announcement can be retrieved from database 126 when notification dispatcher 130 receives an appropriate trigger with retrieval instructions.

Notification dispatcher 130 may store additional data, such as text, pre-recorded voice, music, and video data, that may be related to the scheduling call entry. Notification dispatcher 130 may optionally delete the additional data from database 126 when it is no longer needed, such as after a delivery has been successfully executed. Notification dispatcher 130 may also resolve names or logical addresses of call recipients to identify the physical addresses of the endpoint devices that will receive calls. In one embodiment, a database that includes directory information or an address book lookup table can be used to resolve this information.

In one embodiment, notification dispatcher 130 formulates the type of scheduled calling action and all the necessary parameters for the action and passes them to server 140 (e.g., a telephony server) in the form of a call request. Consistent with one aspect of this invention, the request may specify the use of a call-transfer function. Notification dispatcher may include a dynamically extensible list of templates, which may specify how to formulate a call request, depending on the call control servers and networks used.

Formulation of a call request may involve gathering call information from database 120. Call information may include, for example, a call date, a call time, a requesting party identifier, a requested party identifier, and any combination thereof. The requesting and requested party identifiers may be endpoint device addresses or any other identifiers that may be used to find these addresses. Those skilled in the art will appreciate that the requesting party and requested party identifiers may be the same.

Notification dispatcher 130 may also retrieve a party identifier from scheduler 125, determine a party endpoint device address using the party identifier, and pass a call request to server 140, including endpoint device addresses. If the endpoint device address is not included in the request, it may be found in database 120, such as database 126. For example, given a party identifier, such as "Mom," the system may search database 120 for the endpoint device address (e.g., 555-1212), associated with that identifier. The step of determining the address may be performed at any convenient time between user configuring the scheduling entry and call delivery, but may be performed by dispatcher 130 just before requesting a call. In one embodiment, notification dispatcher 130 may parse the content of the trigger to determine the type of call to be executed against the server and any resources needed to perform the call. In one embodiment, the trigger may include all the information necessary to successfully deliver the call. In another embodiment, the trigger merely provides storage locations that notification dispatcher 130 uses to locate the necessary information.

Notification dispatcher 130 may also report call status information to a user. For example, when a user has a PDA, call status information can be sent to that PDA. In one embodiment, dispatcher 130 receives call status information from a server and reports it to the user. The status of a call may be, for example, "scheduled," "active," "failed," "retry," and "completed."

The "scheduled" status may mean that a user has scheduled a call and the call is pending delivery. The "active" status may mean that a call is in progress; that is, call delivery has commenced. The "failed" status may mean that a call was attempted, but failed. Additional status information may be provided as well, including reasons for a failure. The "retry" status may mean that a call was previously attempted, failed, and attempt is or will be made to redeliver the call. The "completed" status may mean that a call has been successfully delivered. Those skilled in the art will appreciate that additional status information may be reported and that other status nomenclature may be used consistent to this invention.

Upon receiving a call status for a particular call, such as a "completed" status, dispatcher 130 may invoke a database management application to delete data (such as call or additional information) stored in the database that is related to the call. Also, upon receiving of a call status that has failed, notification dispatcher 130 may cause a database management application to check certain information (such as user, call, and/or additional information) for accuracy and/or endpoint device compliance. In one embodiment, notification dispatcher 130 can reschedule a call using updated or modified configuration information, if necessary. Those skilled in the art will appreciate that notification dispatcher 130 may repeatedly reschedule a call until the call is successfully made.

In some cases, notification dispatcher 130 may match a notification message (e.g., trigger) generated by scheduler 125 with additional data stored in database 126, which may be related to the scheduling entry. As mentioned above, dispatcher 130 may resolve the names or logical addresses of the call recipients using a database (e.g., a lookup table) to determine the physical addresses of the endpoint devices that will participate in the scheduled call. Also, dispatcher 130 may receive a call completion status from server 140 and report it to a user's electronic calendar or scheduling application.

Server 140 is a device that includes call control functionality. For example, server 140 may be a telephony server capable of creating and delivering telephony calls using VoIP, PSTN, and cellular networks. This device can be represented, for example, by a PSTN switch (SSP), or a VoIP SIP Proxy Server, or a VoIP softswitch. Server 140 may interoperate with other telephony devices that may be used consistent with this invention (e.g., VoIP gateways, VoiceXML platforms, media/announcement servers, PSTN advanced intelligent networks (hereinafter, "AIN") service nodes, as well as SCP-s). Some of these devices may also include call control functionality. Also, some of these devices may be used as endpoint devices by server 140. For example, media server may be used as an endpoint device. Depending on the endpoint devices used, call control signaling and the resulting communication channel may be in one of the above-mentioned domains or may span multiple domains.

As already mentioned, server 140 may be any entity or set of entities with call control functionality. During operation, server 140 receives a request to make a network-initiated call from notification dispatcher 130 and then delivers the call. Call delivery includes calling a first device (such as a requesting party endpoint device or media service endpoint), calling a second device (such as a requested party endpoint device), and then bridging the endpoint devices.

It will be appreciated that more than two devices may be bridged and that the requesting party need not take part in the call (e.g., when scheduling a conference call using the dial-in connection method when there are multiple scheduled calls). It will further be appreciated that a call may involve the delivery of a substantially continuous stream of data to an endpoint device, thereby enabling the playing of sound or video in real time as it is downloaded (as opposed to storing it in a local file first). In one embodiment, the stream of data can be scheduled by the user and delivered to a recipient using a media server, for example, of the server. In one embodiment, a plug-in application (e.g., a program that can easily be installed and used as part of a web browser, such as Netscape® Navigator, etc.) decompresses and plays the data as it is transferred to a computer over the Internet.

Also, after completing a first call, the server (e.g., using an announcement or media server) may query the party at the endpoint device for further information before the completing a subsequent call. For example, the server may request permission from the party at the endpoint device to complete a subsequent call. Those skilled in the art will appreciate that database 120 may store user information, call information, and other additional information, and include multiple physically or logically separate databases 122, 124, and 126, respectively.

A method consistent with this invention may include the process of provisioning a user, which involves receiving and storing information related to the user (e.g., subscribed services, preferences, etc.). Those skilled in the art will appreciate that once a user is provisioned, the system can track user activity, store user preferences, and monitor user activity patterns. Such a method may be performed on a system like the one shown in FIG. 1.

FIG. 2 illustrates an exemplary method for provisioning a user. The illustrative method includes, for example, receiving user information from a user through a provisioning device in step 205 and storing the user information in a database, such as database 120, in step 208. Those skilled in the art will appreciate that the provisioning process is optional. As shown in FIG. 2, the method may be repeated as necessary and may occur before, during, or after a scheduled call takes place. Some of the user information that may be received includes data used to identify a user (i.e., user identification data) and data that specifies user-requested calling services, such as person-to-person telephony calling services, third-party break-in services, information services, traffic report services, and combinations thereof (i.e., user preference data).

A method consistent with invention includes scheduling calls. FIG. 3 illustrates an exemplary method for scheduling (i.e., "configuring") at least one call. During call configuration, call information (that corresponds to a scheduled entry) can be received in step 212 and stored in a database in step 214. Call configuration may also involve storing additional types of data, including text, pre-recorded voice, pre-recorded music, and pre-recorded video. As indicated by FIG. 3, the method may be repeated as necessary. As explained more fully below, once additional data are stored in database 126, the formulation of a request in step 246 of FIG. 4 may include repeatedly retrieving data until the corresponding call is successfully delivered or cancelled.

Figure 4:
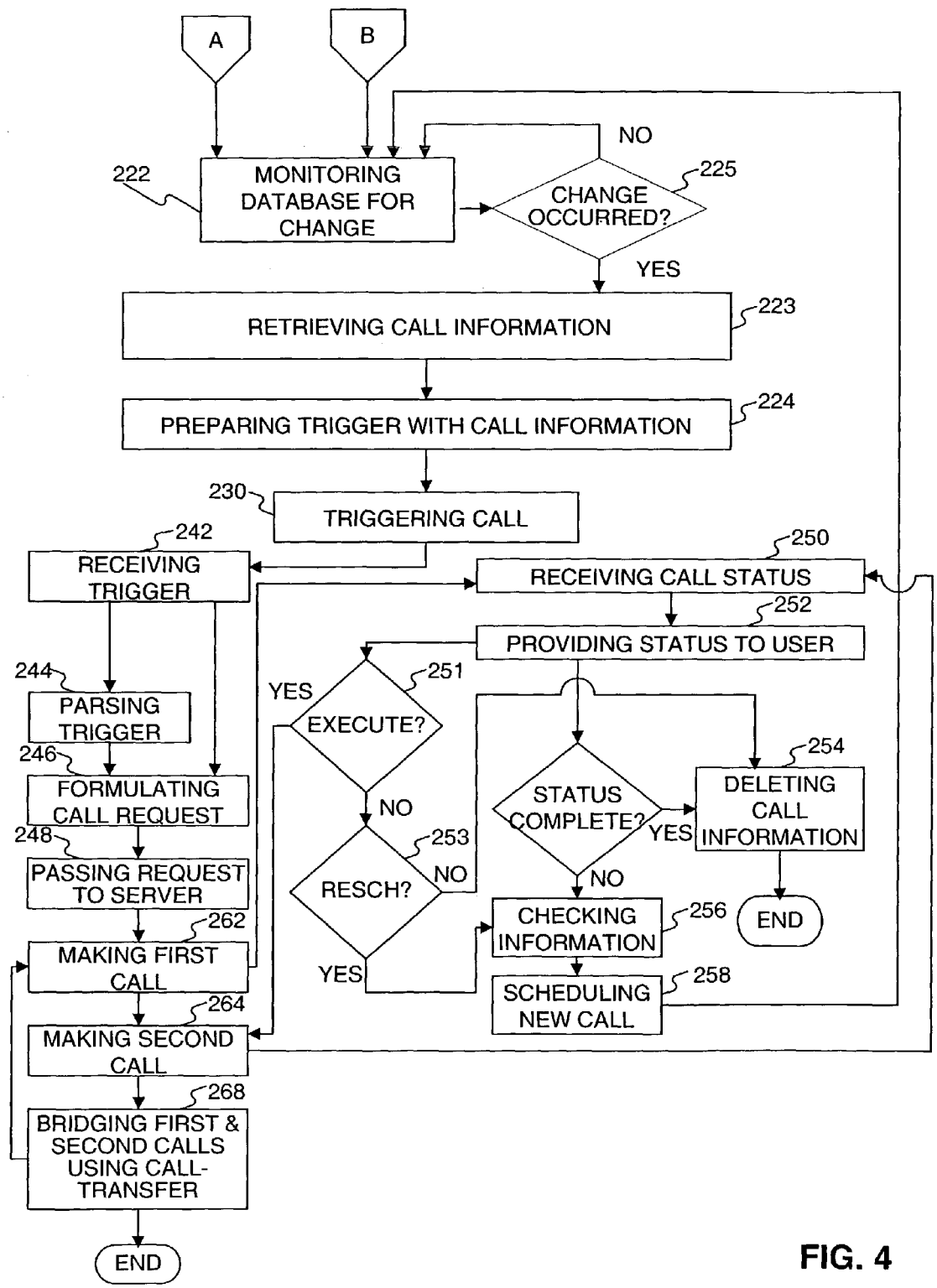
FIG. 4 illustrates an exemplary method for scheduling and delivering calls consistent with the present invention.

FIG. 4 illustrates an exemplary method for scheduling and delivering calls consistent with the present invention, which may use a system, for example, like the one shown in FIG. 1, and the methods of FIGS. 2 and 3. After call information has been received and stored, a call may be scheduled, for example, by monitoring the database in step 222, and if it is determined that the database has changed in step 225, retrieving the call information from the database in step 223, and preparing the trigger using the retrieved call information in step 224. In another embodiment, the database is not monitored and information in step 223 is event-driven, that is when a scheduling entry is due the trigger application runs in step 224. Call information may include, for example, a call date, a call time, a requesting party identifier, a requested party identifier, and any combination of this information. It may also include a requesting party identifier, which may be a requesting party endpoint device address.

When call information is retrieved in step 212 from the scheduling user, and at least temporarily stored in step 214, formulating a call request in step 246 (which is part of the dispatching process) may include retrieving the requesting party identifier from the scheduler and determining a requesting party endpoint device address using the requesting party identifier. Then, dispatching may further include passing a call request to a server via a notification dispatcher that includes at least the requesting party endpoint device address. In other words, the requestor can decide at the very last moment (when the scheduled call arrives to him/her) what number or name to call.

The process of determining an endpoint device may include using a database that includes multiple possible endpoint device addresses to identify the requesting party endpoint device address. The process of retrieving call information may also include retrieving a requested party identifier that is a requested party endpoint device address.

Thus, formulating a call request in step 246 may include retrieving the requested party identifier from the scheduler and determining a requested party endpoint device address using the requested party identifier. The dispatching can further include passing a call request to a server via a notification dispatcher that includes at least the requested party endpoint device address (e.g., and any other endpoint device address required to complete the call). In this case, the step of determining a requested party may include the use of a database that includes a plurality of possible endpoint device addresses to identify the requested party endpoint device address. It is also possible to use a requested party's terminating services. The step of determining may be performed at the time at which the call is delivered (i.e., in the notification dispatcher) or at some time prior to the call.

Once a trigger has been prepared with the call information in step 224, it may be used to trigger, in step 230, the dispatching process, by causing the scheduler to generate a scheduling trigger and sending the trigger to notification dispatcher 130. Dispatching may include, upon receiving a trigger in step 242, parsing the content of the trigger in step 244 to determine the type of call to be executed against the server and any resources needed to perform the call. It will be appreciated that the step of parsing may be unnecessary depending on the nature of the trigger. Nonetheless, once a trigger has been received with sufficient information to place a call, a call request may be formulated.

Notification dispatching functionality may further include receiving a call status from the server and electronically providing that status to the user. The process of receiving a call status in step 250 may involve receiving a scheduled status, an active status, a failed status, a retry status, and a completed status. Once the call status is received, it may be, provided to one or more users in step 252. If the status is completed, the dispatching process may optionally include the process of deleting data stored in the database in step 254. If the call status is not completed (e.g., failed), the process of dispatching may further include checking user information and/or call information in step 256 and scheduling a new call in step 258. Alternatively, if the status of the call is determined to be in condition for execution in step 251, a second call can be made in step 264. If the status is not in condition for rescheduling, the call information can be deleted from the database in step 254.

After dispatching, the call may be delivered with a server upon receiving a request from the dispatcher. Delivery may include making a first call to an endpoint device of a requesting party in step 262, making a second call to an endpoint device of a requested party in step 264, and bridging the first and second calls in step 268. If the scheduled call only involves sending a message to one receiving party, then step 262 can be associated with the call to a media server and step 264 can be associated with the call to the receiving party.

Bridging two calls in step 268 using a call-transfer function is useful for initiating or partially forming real-time communication sessions between two participants, although additional participants may be included.

During step 262, a server may query a requesting party for further information before the making of a second call leg. This could include requesting permission to make another call in step 264, or bridging two calls in step 268.

Thus, it is seen that methods and systems may be provided that manage the scheduling of telephony-based calls and automate the process of making and delivering these calls. One skilled in the art will appreciate that the present invention may be practiced by other than the described embodiments, which are presented for purposes of illustration and not of limitation.

What is claimed is:

1. A method for making a call that invokes a call-transfer function, wherein the call-transfer function enables a user to connect at least three endpoint devices to form a call on a network, the method comprising:
provisioning, via a web interface, a call request in accordance with a schedule;
formulating the call request in accordance with the schedule, wherein the formulating includes identification of at least two endpoint devices for the network to establish a call using a call-transfer function;
establishing a first call leg to a first endpoint device of the at least three endpoint devices;
establishing a second call leg to a second endpoint device of the at least three endpoint devices;
sending a call-transfer signal to a server associated with the network to use the call-transfer function to bridge the first call leg and the second call leg, to connect the first endpoint device and the second endpoint device via a direct channel in accordance with the call request and the schedule and without an intermediary that maintains multiple outbound call connections forming an indirect channel between the first endpoint device and the second endpoint device;
establishing a third call leg to a third endpoint device of the at least three endpoint devices;
connecting at least the first, second, and third call legs in accordance with the call request and the schedule; and
rescheduling the call request based on one or more user preferences if the call request is not connected successfully,
wherein the third call leg is established and connected automatically and independent of parties to the call at the first endpoint device and the second endpoint device.

2. The method of claim 1 further comprising receiving a trigger, wherein the formulating is in response to the receiving.

3. The method of claim 2 further comprising generating a trigger, wherein the receiving is in response to the generating.

4. The method of claim 1 wherein the provisioning comprises:
receiving user information from the user; and
storing the user information in a database.

5. The method of claim 4 wherein the receiving comprises receiving data selected from a group consisting of user identification data, user preference data, and a combination thereof.

6. The method of claim 5 wherein the user preference data comprises at least one calling service selected from a group consisting of a person-to-person telephony calling service, a break-in service, an information service, a traffic report service, and any combination thereof.

7. The method of claim 1 further comprising configuring the call, wherein the configuring comprises:
receiving call information; and
storing the call information in a database.

8. The method of claim 7 wherein the configuring further comprises storing in the database additional data selected from a group consisting of text, pre-recorded voice, pre-recorded music, pre-recorded video, and any combination thereof.

9. The method of claim 8 wherein the formulating comprises retrieving the additional data from the database.

10. The method of claim 9 wherein the retrieving additional data is repeated until the call is either successfully delivered or cancelled.

11. A method for establishing a call between at least three parties, the method comprising:
provisioning a call via a voice portal;
scheduling the call;
triggering the call by generating a trigger in accordance with a schedule;
dispatching the call, wherein the dispatching comprises receiving the trigger and formulating a call request that invokes a call-transfer function;
sending the call request to a server;
delivering the call with the server at a delivery time upon the server receiving the request from the notification dispatcher using the call-transfer function;
establishing a first call leg to a first party of the at least three parties;
establishing a second call leg to a second party of the at least three parties,
wherein the call-transfer function connects the first party and the second party via a call connection to bridge the first call leg and the second call leg, to establish a direct channel between the first party and the second party and does not connect the first party and the second party via an intermediary that maintains multiple outbound call connections forming an indirect channel between the first party and the second party;
establishing a third call leg to a third party of the at least three parties;
connecting at least the first, second, and third call legs in accordance with the call request and the schedule; and
rescheduling the call based on one or more user preferences if the call is not connected successfully,
wherein the third call leg is established and connected automatically and independent of the first party and the second party.

12. The method of claim 11 wherein the provisioning comprises:
receiving user information from a user; and
storing the user information in a database.

13. The method of claim 12 wherein the receiving comprises receiving data selected from a group consisting of user identification data, user preference data, and a combination thereof.

14. The method of claim 13 wherein the user preference data comprises at least one calling service selected from a group consisting of a person-to-person telephony calling service, a break-in service, an information service, a traffic report service, and any combination thereof.

15. The method of claim 11 further comprising configuring the call, wherein the configuring comprises:
receiving call information; and
storing the call information in the database.

16. The method of claim 11 wherein the formulating comprises retrieving additional data from the database.

17. The method of claim 11 wherein the scheduling comprises:
receiving the call information;
inserting the call information into the database;
retrieving the call information from the database; and
preparing the trigger using the call information.

18. The method of claim 17 wherein the retrieving comprises retrieving call information selected from a group consisting of a call date, a call time, a requesting party identifier, a requested party identifier, and any combination thereof.

19. The method of claim 18 wherein the formulating comprises:
retrieving the requesting party identifier from the scheduler; and
determining a requesting party endpoint device address using the requesting party identifier, and wherein the dispatching further comprises passing a call request to a server that includes at least the requesting party endpoint device address.

20. The method of claim 19 wherein the determining comprises using a database that includes a plurality of possible endpoint device addresses to identify the requesting party endpoint device address.

21. The method of claim 11 wherein the formulating comprises:
retrieving a requested party identifier from the scheduler;
determining a requested party endpoint device address using the requested party identifier; and wherein the dispatching further comprises passing a call request to a server that includes at least the requested party endpoint device address.

22. The method of claim 21 wherein the determining comprises using a database that includes a plurality of possible endpoint device addresses to identify the requested party endpoint device address.

23. The method of claim 22 wherein the determining is performed at the delivery time.

24. The method of claim 11 wherein the dispatching comprises parsing the content of the trigger to determine the type of call to be executed against the server and any resources needed to perform the call.

25. The method of claim 11 wherein the dispatching comprises:
receiving a call status from the server; and
reporting that status to a user.

26. The method of claim 25 wherein, upon the receiving of a call status that is completed, the dispatching further comprises causing a database management application to delete data stored in the database related to the call.

27. The method of claim 11 wherein the bridging comprises forming a real-time communication session between two or more participants.

28. The method of claim 11 wherein the establishing the first call leg comprises causing the server to query the requesting party for further information before the establishing of the second call leg.

29. The method of claim 28 wherein the causing the server to query comprises requesting permission to perform the establishing of the second call.

30. A method for making a call that invokes a call-transfer function, wherein the call-transfer function enables a user to connect at least three endpoint devices to form a call on a network, the method comprising:
provisioning, via a web interface, a call request in accordance with a schedule;
formulating the call request, wherein the call request invokes a call-transfer function in accordance with the schedule;
placing a call on the network in accordance with the call request;
establishing a first call leg to a first endpoint device of the at least three endpoint devices; and
establishing a second call leg to a second endpoint device of the at least three endpoint devices,
wherein the call-transfer function connects the first endpoint device and the second endpoint device via a call connection by bridging the first call leg and the second call leg, to establish a direct channel between the first endpoint device and the second endpoint device and without an intermediary that maintains multiple outbound call connections forming an indirect channel between the first endpoint device and the second endpoint device;

establishing a third call leg to a third endpoint device of the at least three endpoint devices;

connecting at least the first, second, and third call legs; and rescheduling the call request based on one or more user preferences if the call request is not connected successfully, wherein the third call leg is established and connected automatically and independent of parties to the call at the first endpoint device and the second endpoint device.

31. A system for scheduling services and delivering calls, wherein the system comprises:

a device for receiving, via a web interface, at least one scheduling entry relating to a call;

a database for storing the information;

a scheduler for generating a trigger for the at least one entry at a calling time;

a notification dispatcher that formulates a call request in response to receiving the trigger, wherein the call request invokes a call-transfer function; and a server that establishes a first call leg to a first party of at least three parties, establishes a second call leg to a second party of the at least three parties, and establishes a third call leg to a third party of the at least three parties;

wherein the notification dispatcher reschedules the call based on one or more user preferences if the call is not connected successfully, wherein the call-transfer function connects the first party and the second party via a call connection by bridging the first call leg and the second call leg, to establish a direct channel between the first party and the second party, and does not connect the first party and the second party via an intermediary that maintains multiple outbound call connections forming an indirect channel between the first party and the second party, and wherein the server connects the third party to the first party and the second party, automatically and independent of the first party and the second party.

32. The system of claim 31 wherein the device comprises an interface selected from a group consisting of a computer-based user interface, a telephony-based interface, and a combination thereof.

33. The system of claim 31 wherein the device interoperates with the scheduler to store data selected from a group consisting of the user information, the at least one scheduling entry, and a combination thereof.

34. The system of claim 31 wherein the scheduler uses calendar software based, at least in part, on an iCalendar specification RFC 2445.

35. The system of claim 31 wherein the scheduler comprises a trigger application that invokes the notification dispatcher when a scheduling entry is due.

36. The system of claim 31 wherein the dispatcher identifies a physical address of an endpoint device of at least one call recipient that will participate in the call.

37. The system of claim 36 wherein the server identifies a physical address by using call recipient identification information selected from a group consisting of a call recipient name and a call recipient logical address.

38. The system of claim 37 wherein the dispatcher uses the call recipient identification information by retrieving the call recipient identification information from a source selected from a group consisting of a database, a directory, an address book, and any combination thereof.

39. The system of claim 31 wherein the server is a logical device with call control functionality capable of creating and delivering calls to endpoint devices in a domain selected from a group consisting of a VoIP domain, a PSTN domain, and a cellular domain.

40. The system of claim 39 wherein the server is selected from a group consisting of a VoIP gateway, a softswitch, a SIT proxy server, a VoiceXML platform, a Media/Announcement Server, a PSTN AIN service node, an SCP, PSTN switch, and any combination thereof.

41. The method of claim 1 further comprising providing an option to continue with the call request in accordance with the schedule, reschedule the call request, or discard the call request.

* * * * *